United States Patent
Little et al.

(10) Patent No.: US 10,394,598 B2
(45) Date of Patent: Aug. 27, 2019

(54) SYSTEM AND METHOD FOR PROVIDING MSSQ NOTIFICATIONS IN A TRANSACTIONAL PROCESSING ENVIRONMENT

(71) Applicant: Oracle International Corporation, Redwood Shores, CA (US)

(72) Inventors: Todd Little, Palatine, IL (US); Qingsheng Zhang, Beijing (CN); Jim Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 123 days.

(21) Appl. No.: 14/997,358

(22) Filed: Jan. 15, 2016

(65) Prior Publication Data

US 2017/0116027 A1    Apr. 27, 2017

Related U.S. Application Data

(63) Continuation-in-part of application No. PCT/CN2015/092573, filed on Oct. 22, 2015.

(51) Int. Cl.
*G06F 9/46* (2006.01)
*G06F 9/54* (2006.01)

(52) U.S. Cl.
CPC ............... *G06F 9/467* (2013.01); *G06F 9/54* (2013.01); *G06F 9/546* (2013.01); *G06F 2209/548* (2013.01)

(58) Field of Classification Search
None
See application file for complete search history.

(56) References Cited

U.S. PATENT DOCUMENTS

| | | |
|---|---|---|
| 6,681,251 B1 | 1/2004 | Leymann |
| 2003/0185227 A1 | 10/2003 | Le |

(Continued)

FOREIGN PATENT DOCUMENTS

| | | |
|---|---|---|
| WO | 2001038972 | 5/2001 |
| WO | 2009014868 | 1/2009 |

OTHER PUBLICATIONS

International Searching Authority, International Application Division, Korean Intellectual Property Office, International Search Report and Written Opinion dated Feb. 15, 2017 for International Application No. PCT/US2016/057947, 13 Pages.

(Continued)

*Primary Examiner* — Wynuel S Aquino
*Assistant Examiner* — Melissa A Headly
(74) *Attorney, Agent, or Firm* — Tucker Ellis LLP

(57) ABSTRACT

In accordance with an embodiment, described herein is a system and method for making requests to a specific server in a transactional processing environment with a multiple servers, single queue (MSSQ) configuration. Each server in a MSSQ set can be associated with a secondary request queue, and can include a main thread, a secondary thread, and an internal memory queue. Each server can use an application programming interface (API) to advertise one or more non-unanimous services on a secondary request queue associated with that server. The secondary thread of a particular server is configured to dequeue, from the secondary request queue associated with the particular server, a request message for a non-unanimous service, and stores the dequeued message in the internal memory queue. The main thread of the particular server checks the internal memory queue before checking the main request queue for messages to process.

20 Claims, 4 Drawing Sheets

(56) References Cited

U.S. PATENT DOCUMENTS

| | | |
|---|---|---|
| 2004/0039777 A1 | 2/2004 | Bock |
| 2007/0237082 A1 | 10/2007 | Han |
| 2008/0109452 A1* | 5/2008 | Patterson ............ H04L 67/1036 |
| 2010/0229025 A1 | 9/2010 | Qutub |
| 2013/0024875 A1* | 1/2013 | Wang ...................... G06F 13/22 |
| | | 719/318 |
| 2013/0086238 A1 | 4/2013 | Li |
| 2013/0086271 A1 | 4/2013 | Li |
| 2014/0181833 A1 | 6/2014 | Bird |

OTHER PUBLICATIONS

International Searching Authority, State Intellectual Property Office of the People'S Republic of China, Notification of Transmittal of the International Search Report and the Written Opinion of the International Searching Authority, or the Declaration Dated Jul. 20, 2016 for International Application No. PCT/CN2015/092573, 13 Pages.
Extended European Search Report for European Patent Application No. 16858231.0 dated May 28, 2019, 9 pages.

* cited by examiner

SYSTEM AND METHOD FOR PROVIDING MSSQ NOTIFICATIONS IN A TRANSACTIONAL PROCESSING ENVIRONMENT

CLAIM OF PRIORITY

This application is a continuation-in-part application of and claims the benefit of priority to International Application titled "SYSTEM AND METHOD FOR PROVIDING MSSQ. NOTIFICATIONS IN A TRANSACTIONAL PROCESSING ENVIRONMENT", International Application No. PCT/CN2015/092573, filed Oct. 22, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers, and are particularly related to a system and method for providing multiple servers, single queue (MSSQ) notifications in a transactional processing environment.

BACKGROUND

In a transactional processing environment, for example a Tuxedo environment, a request queue can be shared by multiple servers for load balancing. In such a multiple servers, single queue (MSSQ) configuration, each server typically needs to support the exact same set of services. Otherwise, if a server supports a particular service that one or more other servers do not support, one of the servers not supporting the particular service may dequeue a request message for the particular service from the request queue. As such, it would be very challenging to make requests or send notifications, to specific servers in a transactional processing environment with an MSSQ configuration.

SUMMARY

In accordance with an embodiment, described herein is a system and method for making requests to specific servers in a transactional processing environment with a multiple servers, single queue (MSSQ) configuration. A main request queue in the transactional processing environment can be shared by a plurality of servers, and can advertise one or more unanimous services supported by each server. A secondary request queue can be provided for each server, and can advertise one or more non-unanimous services not supported by at least one server. Each server can include a main thread, a secondary thread, and an internal memory queue.

In accordance with an embodiment, a request message for a unanimous service can be placed on the main request queue, and be dequeued by the main thread of any server in the MSSQ set. A request message for a non-unanimous service can be placed on the secondary request queue of a server supporting the non-unanimous service, and can be dequeued by the secondary thread of the server. The dequeued request message can be stored in the server's internal memory queue to be retrieved for processing by the main thread of the server.

In accordance with an embodiment, an application programming interface (API) can be provided to advertise the one or more non-unanimous services. One or more server parameters in a domain configuration file can be used to enable the features described above.

DETAILED DESCRIPTION

Figure 1:
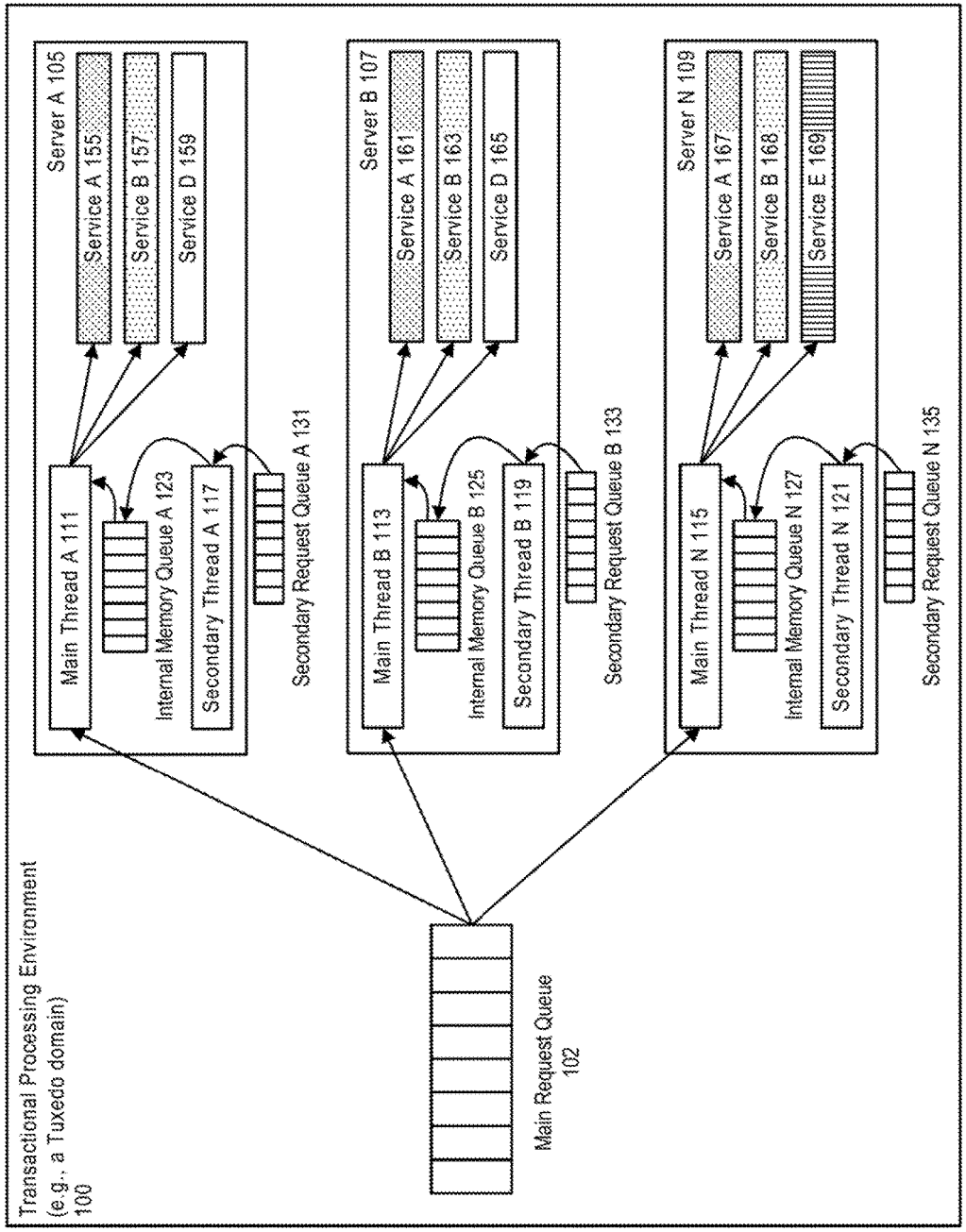
FIG. 1 illustrates a system for making requests to specific servers in a transactional processing environment with an MSSQ configuration, in accordance with an embodiment.

In a typical transactional processing environment with an MSSQ configuration, requests messages are placed on a main request queue, and can be dequeued by each server in an MSSQ set. Such a configuration can improve system performance by load-balancing client requests among multiple servers.

However, the MSSQ configuration requires that each server in the MSSQ set to support and advertise identical services, which makes it difficult to make requests to a specific server. This drawback of the MSSQ configuration can have a plurality of performance hindering impacts. For example, because the transactional processing environment cannot confirm if a request message has been dequeued by a specific server, the transactional processing environment would not be able to support)XA-affinity for performance enhancement.

In accordance with an embodiment, described herein is a system and method for making requests to specific servers in a transactional processing environment with a multiple servers, single queue (MSSQ) configuration. A main request queue in the transactional processing environment can be shared by a plurality of servers, and can advertise one or more unanimous services supported by each server. A secondary request queue can be provided for each server, and can advertise one or more non-unanimous services not supported by at least one server. Each server can include a main thread, a secondary thread, and an internal memory queue.

In accordance with an embodiment, when a non-unanimous service is supported by a single server instance either in a MSSQ set or in a domain, the non-unanimous service can be considered a singleton service.

In accordance with an embodiment, a request message for a unanimous service can be placed on the main request queue, and be dequeued by the main thread of any server in the MSSQ set. A request message for a non-unanimous service can be placed on the secondary request queue of a server supporting the non-unanimous service, and can be dequeued by the secondary thread of the server. The dequeued request message can be stored in the server's internal memory queue to be retrieved for processing by the main thread of the server.

In accordance with an embodiment, an application programming interface (API) can be provided to advertise the one or more non-unanimous services. The API can additionally be used to advertise non-unanimous services or singleton services on a secondary request queue of a server, for example, a Tuxedo server. With the API, a client application would be able to make a service request to a specific server through a non-unanimous service, even if the specific server is in an MSSQ set.

In accordance with an embodiment, the above-described feature can be enabled through a server parameter in a server configuration file. With this feature enabled, an application server can create a secondary request queue, and a secondary thread to receive messages from the secondary request queue. The messages received from the secondary request queue can be stored into a memory queue, to be exchanged with the main thread of the server.

In addition, with the feature enabled, XA affinity can be supported in the transactional processing environment, as a service request can be sent to a specific server instance in an MSSQ set, as well as to all servers in the MSSQ set.

FIG. 1 illustrates a system for making requests to specific servers in a transactional processing environment with an MSSQ configuration, in accordance with an embodiment.

As shown in FIG. 1, a transactional processing environment 100, for example a Tuxedo domain, can include a main request queue 102 shared by a plurality of servers (for example, server A 105, server B 107, and server N 109).

As further shown in FIG. 1, each server can include a main thread (for example, main thread A 111, main thread B 113, or main thread N 115), a secondary thread (for example, secondary thread A 117, secondary thread B 119, or secondary thread N 121), and an internal memory queue (for example, internal memory buffer A 123, internal memory buffer B 125, or internal memory buffer N 127). Each server can additionally be associated with a secondary request queue (for example, secondary request queue A 131, secondary request queue B 133, or secondary request queue N 135).

In accordance with an embodiment, each of the main request queue and the secondary request queues can be an inter-process communication (IPC) queue, wherein the main thread of each server can listen on the main request queue for messages, and the secondary thread of each server can listen on the secondary request queue associated with that server.

In accordance with an embodiment, each server can support one or more unanimous services, and one or more non-unanimous services. As used herein, a unanimous service is a service that is supported by each of the plurality of servers that share the main request queue; and a non-unanimous service is a service that is not supported by at least one server that shares the main request queue, or a singleton service.

As shown in FIG. 1, service A and B are unanimous services that are supported by each server, as shown by services A 155 and B 157 on server A, services A 161 and B 163 on server B, and services A 167 and B 168 on server N. In contrast, Services D and E are non-unanimous services, each of which is not supported by at least one server. For example, service D is supported only by servers A and B, as shown by service D 159 and service D 165; and service E 169 is supported only by server N.

In accordance with an embodiment, each server can advertise the unanimous service on the main request queue using an API, and advertise the non-unanimous service on the secondary request queue associated with that server. A request message directed to a unanimous service can be placed on the main request queue, and can be dequeued by the main thread of any server that shares the main request queue.

In accordance with an embodiment, all the main threads in the servers that are part of an MSSQ set are operating to dequeue request messages from the main request queue simultaneously if they are idle. When a request message is placed in the main request queue, all of the servers waiting on that main request queue are woken up and try to retrieve the request message. However, only one of them can succeed, and the rest can go back to a waiting state.

As shown above, a request message directed to a unanimous service can be dequeued by the main thread of any server if that server is idle. As such, a request message directed to a non-unanimous service, if placed on the main request, may be dequeued by the main thread of a server that does not support that non-unanimous service.

However, in accordance with an embodiment, when a request message directed to a non-unanimous service is placed on the secondary request queue associated with a server that supports that non-unanimous service, the secondary thread in the server can dequeue the request message, and store the dequeued message in the server's internal memory queue or an internal memory buffer, so that the main thread, before making itself available to dequeue messages from the main request queue, can check the secondary request queue for any available message for processing.

Figure 2:
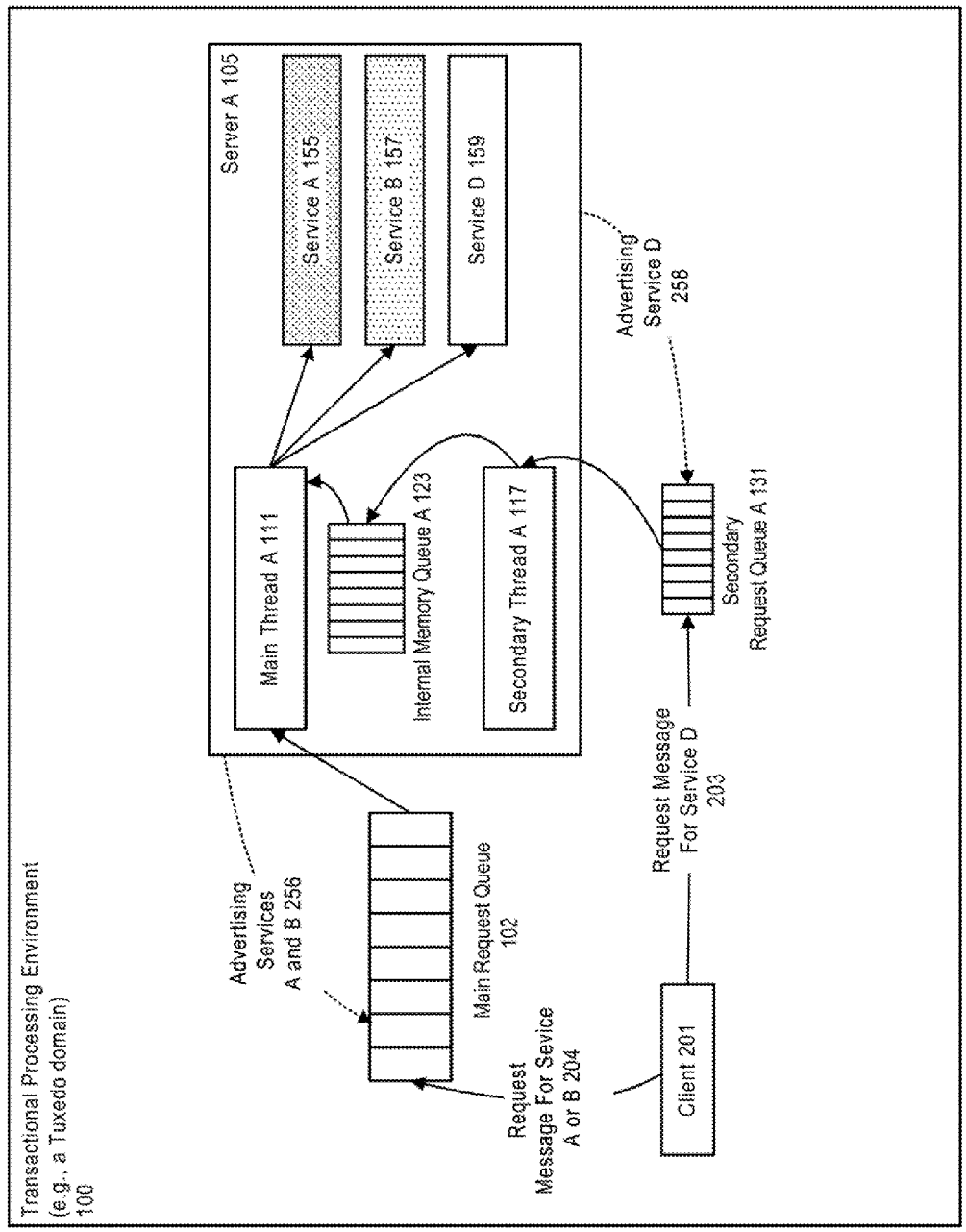
FIG. 2 further illustrates a system for making requests to specific servers in a transactional processing environment with an MSSQ configuration, in accordance with an embodiment.

FIG. 2 illustrates a system for making requests to specific servers in a transactional processing environment with an MSSQ configuration, in accordance with an embodiment.

As shown in FIG. 2, one of the plurality of servers in the MSSQ set (server A) can advertise 256 a plurality of unanimous services (for example, services A and B) on the main request queue; and can advertise 258 one or more non-unanimous services (for example, service D) on the secondary request queue.

In accordance with an embodiment, a client 201 can place 204 a request message for a unanimous service on the main request queue. If the main thread of server A is idle, the main thread can operate to dequeue the request message from the main request queue for dispatching.

In accordance with an embodiment, if server A is a single threaded server from the perspective of the client, the main thread, after retrieving the request message from the main request queue, can call a service routine associated with the unanimous service. If server A is a multi-threaded server, the main thread can hand the request message to a dispatch thread which calls the service routine associated with the unanimous service.

In accordance with an embodiment, if the client needs to make a request for a non-unanimous service on a specific server (for example, server A), the client can place 203 a request message on the secondary request queue of the specific server. The secondary thread of server A can dequeue the request message and store the dequeued request message in the internal memory queue of the specific server. The internal memory can be used to move messages from the secondary request queue to the main thread of the specific server for dispatching. Depending whether the specific server is single-threaded or multi-threaded, the main thread can either directly calls a service routine associated with the non-unanimous service, or hand the request message to a dispatch thread which calls the service routine associated with the non-unanimous service.

In accordance with an embodiment, the main thread can check the internal memory queue for any available messages for processing, before making itself available to dequeue messages from the main request queue.

An Exemplary Implementation

In accordance with an embodiment, each MSSQ server instance can be associated with a secondary request queue, in addition to being associated with a single main request queue. A user can enable this feature through a server parameter in a server configuration section in a UBBCONFIG file. An example UBBCONFIG file can be a configuration file that defines installation-dependent parameters for an application.

In accordance an embodiment, the following steps can be performed to receive notifications from a secondary request queue.
1) Creating a secondary request queue for each server in an MSSQ set;
2) Creating a secondary thread for each server in the MSSQ set;
3) Creating a context for the secondary thread;
4) Creating an internal memory queue which can be used to exchange messages between the secondary thread and the main thread in each server;
5) Receiving a message from the secondary request queue in the secondary thread, and storing the message in the internal memory queue;
6) Retrieving the message from the internal memory queue or buffer and handing the message to the main thread for processing.

In accordance with an embodiment, an advertising application programming interface (API) can be provided to advertise non-unanimous or singleton services on secondary request queues.

In accordance with an embodiment, the advertising API can be illustrated as below:
tpadvertisex(char *svcname, void (*func)(TPS-VCINFO*), long flags)

In the above API, a valid flag can be one of the following: 1). TPSINGLETON, which indicates that the specified service can only be advertised by one server at a time in the current domain or in an MSSQ set; 2). TPSECONDARYRQ, which indicates that the specified service can be advertised on a secondary request queue. If this flag is not set and the secondary request queue is set in the UBBCONFIG configuration file, the service can be advertised on both the main request queue and the secondary request queue.

In accordance with an embodiment, the following are exemplary tperrno indicators (error indicators) for the above-described advertising API: 1). TPENOSINGLETON, which indicates that the svcname is already advertised on another server instance in the current domain; 2). TPENOSECONDARYRQ, which indicates that the svcname is advertised on the secondary request queue of the associated server, but SECONDARYRQ was not set, and the secondary request queue does not exist.

Figure 3:
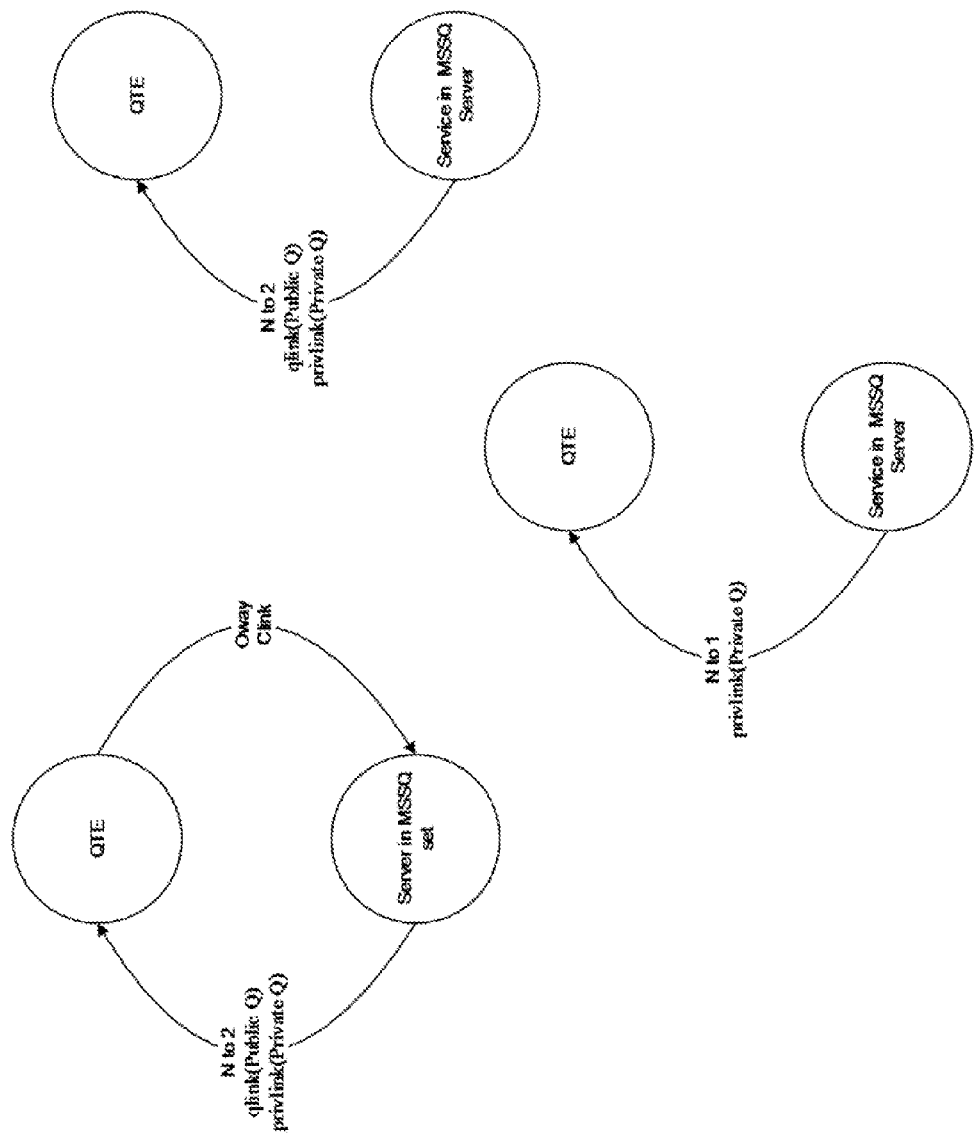
FIG. 3 illustrates relationships between a queue table entry and each of a singleton service, a unanimous service on a server in an MSSQ set, and a server in the MSSQ set, in accordance with an embodiment.

Further, the relationships between one or more queue table entries (QTE) and each of a server in the MSSQ set, a unanimous service on an MSSQ set, and a singleton service in the MSSQ set, can be enhanced as shown in FIG. 3, where "public Q" means a main request queue, and "private Q" means a secondary request queue.

Figure 4:
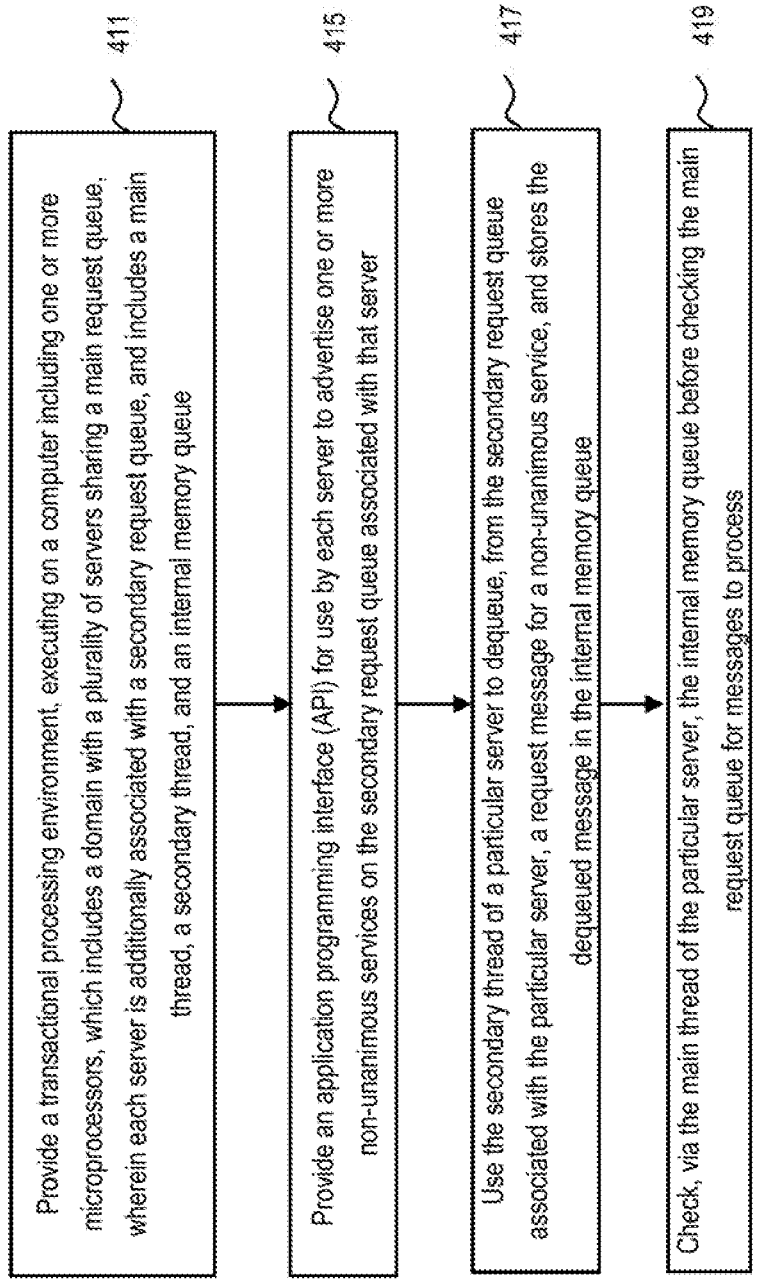
FIG. 4 illustrates a method for making requests to specific servers in a transactional processing environment with an MSSQ configuration, in accordance with an embodiment.

FIG. 4 illustrates a method for making requests to specific servers in a transactional processing environment with an MSSQ configuration, in accordance with an embodiment.

As shown in FIG. 4, at step 411, a transactional processing environment can be provided to execute on a computer including one or more microprocessors, wherein the transactional processing environment can include a domain with a plurality of servers, wherein the plurality of servers share a main request queue, wherein each server is additionally associated with a secondary request queue, and includes a main thread, a secondary thread, and an internal memory queue.

At step 413, an application programming interface (API) can be provided, for use by each server to advertise one or more unanimous services on the main request queue, wherein each unanimous service is supported by each of the plurality of servers. The API can additionally be used by each server to advertise one or more non-unanimous services on the secondary request queue associated with a particular server, wherein each non-unanimous service is supported by the particular server, but not supported by at least one other server in the MSSQ set.

At step 415, the secondary thread in a particular server dequeues a request message for a non-unanimous service from the secondary request queue associated with the particular server, and stores the dequeued request message in the particular server's memory queue.

At step 417, the main thread of the particular server can check the internal memory queue before making itself available for dequeueing messages from the main request queue for messages to process.

At step 419, if the main thread detects an existing message in the internal memory queue, the main thread can either directly calls a service routine associated with the non-unanimous service, or hand the request message to a dispatch thread which calls the service routine associated with the non-unanimous service, depending whether the particular server is single-threaded or multi-threaded.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing multiple servers, single queue (MSSQ) notifications in a transactional processing environment, comprising:
a transactional processing environment executing on one or more microprocessors;
a first server of the transactional processing environment, wherein the first server includes a first main thread and a subsidiary thread, wherein the first server provides a unanimous service and a specific service, wherein the first server is associated with a specific request queue, and wherein the first server includes an internal memory queue;
a second server of the transactional processing environment, wherein the second server includes a second main thread, and wherein the second server provides the unanimous service;
a main request queue of the transactional processing environment, wherein the first server and the second server share the main request queue; and
an application programming interface (API) for use by the first server and the second server, wherein the first server and the second server use the API to advertise the unanimous service on the main request queue, and wherein the first server uses the API to advertise the specific service on the specific request queue;
wherein the main request queue receives and queues a plurality of request messages for the unanimous service, wherein a first request message of the plurality of request messages is dequeued by the first main thread of the first server, and wherein a second request message of the plurality of request messages is dequeued by the second main thread of the second server;
wherein the specific request queue of the first server receives and queues request messages for the specific service, wherein each of the queued request messages for the specific service is dequeued by the subsidiary thread of the first server, and stored in the internal memory queue of the first server; and
wherein the first main thread of the first server checks the internal memory queue of the first server before checking the main request queue for request messages to process.

2. The system of claim 1, wherein the specific service is not supported by the second server.

3. The system of claim 1, wherein the first main thread detects an existing message in the internal memory queue, and calls a service routine associated with the specific service.

4. The system of any of claim 1, wherein the API takes a flag as a parameter, wherein the flag indicates that the specific service is to be advertised on the specific request queue of the first server.

5. The system of any of claim 1, wherein a server parameter in a configuration file is used to enable a request for the specific service to be created for the first server.

6. The system of any of claim 1, wherein each of the main request queue and the specific request queue is an interprocess communication (IPC) queue.

7. The system of claim 1, wherein the specific service is a singleton service and wherein the first server.

8. A method for providing multiple servers, single queue (MSSQ) notifications in a transactional processing environment executing on one or more servers, the method comprising:
providing a first server of the transactional processing environment, wherein the first server includes a first main thread and a subsidiary thread, wherein the first server provides a unanimous service and a specific service, wherein the first server is associated with a specific request queue, and wherein the first server includes an internal memory queue;
providing a second server of the transactional processing environment, wherein the second server includes a second main thread, and wherein the second server provides the unanimous service;
providing a main request queue of the transactional processing environment, wherein the first server and the second server share the main request queue;
advertising, by the first and the second servers, and using an application programming interface (API), the unanimous service on the main request queue;
advertising, by the first server, and using the API, the specific service on the specific request queue;
receiving, at the main request queue, a plurality of request messages for the unanimous service;
receiving, at the specific request queue of the first server, request messages for the specific service;
dequeuing, by the first main thread of the first server, a first request message of the plurality of request messages for the unanimous service;
dequeuing, by the second main thread of the second server, a second request message of the plurality of request messages for the unanimous service;
dequeuing, by the subsidiary thread of the first server, each of the queued request messages for the specific service, wherein each of the dequeued request messages for the specific service is stored in the internal memory queue of the first server; and
wherein the first main thread of the first server checks the internal memory queue of the first server before checking the main request queue for request messages to process.

9. The method of claim 8, wherein the specific service is not supported by the second server.

10. The method of claim 8, wherein the first main thread detects an existing message in the internal memory queue, and calls a service routine associated with the specific service.

11. The method of any of claim 8, wherein the API takes a flag as a parameter, wherein the flag indicates that the specific service is to be advertised on the specific request queue of the first server.

12. The method of any of claim 8, wherein a server parameter in a configuration file is used to enable a request for the specific service to be created for the first server.

13. The method of claim 8, wherein each of the main request queue and the specific request queue is an interprocess communication (IPC) queue.

14. The method of claim 8, wherein the specific service is a singleton service and wherein the first server is a singleton server.

15. A non-transitory computer-readable storage medium storing a set of instructions for providing multiple servers, single queue (MSSQ) notifications in a transactional processing environment, which instructions, when executed by one or more processors, cause the one or more processors to perform steps comprising:

providing a first server of the transactional processing environment, wherein the first server includes a first main thread and a subsidiary thread, wherein the first server provides a unanimous service and a specific service, wherein the first server is associated with a specific request queue, and wherein the first server includes an internal memory queue;

providing a second server of the transactional processing environment, wherein the second server includes a second main thread, and wherein the second server provides the unanimous service;

providing a main request queue of the transactional processing environment, wherein the first server and the second server share the main request queue;

advertising, by the first and the second servers, and using an application programming interface (API), the unanimous service on the main request queue;

advertising, by the first server, and using the API, the specific service on the specific request queue;

receiving, at the main request queue, a plurality of request messages for the unanimous service;

receiving, at the specific request queue of the first server, request messages for the specific service;

dequeuing, by the first main thread of the first server, a first request message of the plurality of request messages for the unanimous service;

dequeuing, by the second main thread of the second server, a second request message of the plurality of request messages for the unanimous service;

dequeuing, by the subsidiary thread of the first server, each of the queued request messages for the specific service, wherein each of the dequeued request messages for the specific service is stored in the internal memory queue of the first server; and wherein the first main thread of the first server checks the internal memory queue of the first server before checking the main request queue for request messages to process.

16. The non-transitory computer-readable storage medium of claim 15, wherein the specific service is not supported by the second server.

17. The non-transitory computer-readable storage medium of claim 15, wherein the first main thread detects an existing message in the internal memory queue, and calls a service routine associated with the specific service.

18. The non-transitory computer-readable storage medium of claim 15, wherein the API takes a flag as a parameter, wherein the flag indicates that the specific service is to be advertised on the specific request queue of the first server.

19. The non-transitory computer-readable storage medium of claim 15, wherein a server parameter in a configuration file is used to enable a request for the specific service to be created for the first server.

20. The non-transitory computer-readable storage medium of claim 15, wherein the specific service is a singleton service and wherein the first server is a singleton server.

* * * * *

UNITED STATES PATENT AND TRADEMARK OFFICE
CERTIFICATE OF CORRECTION

PATENT NO. : 10,394,598 B2
APPLICATION NO. : 14/997358
DATED : August 27, 2019
INVENTOR(S) : Little et al.

Page 1 of 1

It is certified that error appears in the above-identified patent and that said Letters Patent is hereby corrected as shown below:

In the Specification

In Column 2, Line 45, delete "support)XA" and insert -- support XA --, therefor.

In Column 6, Line 30, delete "dequeueing" and insert -- dequeuing --, therefor.

In the Claims

In Column 7, Line 56, in Claim 4, delete "of any of" and insert -- of --, therefor.

In Column 7, Line 60, in Claim 5, delete "of any of" and insert -- of --, therefor.

In Column 7, Line 63, in Claim 6, delete "of any of" and insert -- of --, therefor.

In Column 7, Line 67, in Claim 7, delete "server." and insert -- server is a singleton server. --, therefor.

In Column 8, Line 49, in Claim 11, delete "of any of" and insert -- of --, therefor.

In Column 8, Line 53, in Claim 12, delete "of any of" and insert -- of --, therefor.

Signed and Sealed this
Twenty-fifth Day of August, 2020

Andrei Iancu
*Director of the United States Patent and Trademark Office*